RANGE EXTENSION CIRCUIT

Filed Sept. 6, 1967 3 Sheets-Sheet 1

INVENTORS: J. L. HENRY
W. L. SHAFER, JR.
BY Howard P. Popper
ATTORNEY

April 21, 1970 J. L. HENRY ET AL 3,508,009

RANGE EXTENSION CIRCUIT

Filed Sept. 6, 1967 3 Sheets-Sheet 2

United States Patent Office 3,508,009
Patented Apr. 21, 1970

3,508,009
RANGE EXTENSION CIRCUIT

James L. Henry, Holmdel, and William L. Shafer, Jr., Short Hills, N.J., assignors to Bell Telephone Laboratories, Incorporated, Murray Hill, N.J., a corporation of New York Filed Sept. 6, 1967, Ser. No. 665,754
Int. Cl. H04q *1/30*
U.S. Cl. 179—16 12 Claims

ABSTRACT OF THE DISCLOSURE

Circuitry is disclosed to place a signal-sensitive shunt across the central office end of a high resistance subscriber loop for signaling purposes whenever line current is detected. An R–C network is provided to disable the shunt after a timed interval so that during the talking period the total central office current can flow through the subscriber's telephone. A Zener diode is further provided which breaks down and conducts in the backward direction to disable the shunt whenever ringing current is applied to the loop. This insures that tripping of ringing will not occur until the circuit senses line current produced by the called telephone being placed in the off-hook state.

BACKGROUND OF THE INVENTION

This invention relates to the transmission of telephone signals over subscriber loops and, more particularly, to increasing the loop range over which such signals may be effectively transmitted.

The range of signaling is limited in conventional telephone loop circuits by the attentuation of the level of the transmitted signals. If the loop is particularly long, the signals may be attenuated to a level at which they are no longer useful for their intended purpose. Dial pulses may be degraded to such an extent that the frequency of dialing errors becomes intolerable. This entails the necessity of either using larger gauge wires or else providing additional central offices to service a given area. Any economical means which extends the serviceable range of dial pulse signaling would of course result in the need for less wire and fewer central offices.

One of the prior approaches to extending the signaling range involves the placing of a signal sensitive shunt which acts as a dial pulse amplifier across the central office end of the long loop to complete an operating path to energize the line relay. This method is disclosed in the pending application of F. S. Ingraham, Ser. No. 419,409, filed Dec. 18, 1964, now Patent 3,393,274 which issued July 16, 1968. The problem with this approach is that the shunt remains in the transmission path during the time that talking is taking place and causes degradation of speech since almost half of the central office current passes through the shunt rather than through the subscriber's telephone. Furthermore, the shunt, as disclosed in the above application, is across the called subscriber's loop during the time that ringing current is applied to the loop, causing ringing to be prematurely tripped. Of course, the shunt may be placed between the line relay and the contacts of the line cut-off relay so that it will be taken out of the transmission path before the talking connection is established and will not be in the transmission path at all during ringing. However, this placement of the shunt would require rewiring inside the central office which would "dedicate" a particular line and cut-off relay combination for use with long loops. This is undesirable as it would permit the low random percentage of long loop lines to interfere with the orderly re-assignment of lines and directory numbers in the office.

It is therefore an object of the present invention to extend the range of effective signaling in subscriber loops.

It is another object of the invention to reduce dialing errors due to existing central office equipment not being able to distinguish dial pulses which are greatly attenuated because of excessive subscriber loop length.

It is a further object of this invention to minimize the amount of central office rewiring needed to implement the installation of range extension equipment.

It is a more specific object of the present invention to eliminate degradation of speech and premature tripping of ringing which may result from the use of certain apparatus which is employed to increase the effective signaling range of subscriber loops.

SUMMARY OF THE INVENTION

In accordance with this invention, apparatus for increasing subscriber loop signaling range is provided on a per-loop basis and advantageously may be located at the main distributing frame of the central office despite the fact that the line cut-off relay is not then available to cut out the range extension equipment after the initial signaling interval. The shunt for increasing current through the line relay is provided by the anode-cathode path of a PNPN switch whose anode is connected to one side of the loop and whose cathode is connected to the other side of the loop. The gate-to-cathode resistor for the PNPN switch is adjusted so that the holding current is greater than the normal current which the shunt will be expected to carry when it is enabled. With this arrangement the PNPN switch can be turned on and off via its gate terminal. The collector of a transistor is connected to the gate terminal of the PNPN switch and the emitter and base of this transistor are connected to the same side of the loop as the cathode of the PNPN switch. Normally, the transistor is cut off, for example, when the subscriber is on-hook. However, when the signal condition is subsequently altered, e.g., when the subscriber goes off-hook, the transistor is turned on, allowing the PNPN switch to turn on, providing a low resistance D.C. path via the anode-cathode of the PNPN switch, and thereby presenting an increased level of operating current to the line relay, other dial pulse receiving apparatus, or ring trip relay. In the illustrative embodiment of the present invention, a timing circuit is connected to the base of the transistor in order to put the transistor back into the cut-off condition a predetermined interval after the transistor is turned on. When the transistor turns on it turns off the loop-shunting PNPN switch. The shunt is thus enabled whenever the subscriber's telephone goes from the on-hook to the off-hook condition and is disabled after a short interval. This interval may advantageously be 400 milliseconds in order to insure the operation of the slowest relay likely to be encountered in a telephone plant. When the subscriber begins to dial, the first dial pulse of the first digit will, assuming 10 p.p.s. dialing and 60 percent break. include an on-hook interval of about 60 milliseconds followed by a maximum off-hook interval of about 40 milliseconds. The remaining dial pulses of the first digit will be similar. Succeeding digits will normally be separated from each other by an off-hook interval of at least 500 milliseconds. The shunt will therefore be enabled during the off-hook intervals of the dial pulses comprising a single digit and the timer will be reset during the on-hook intradigit intervals. The shunt, accordingly, "follows" the dial pulses. At the completion of dialing the loop is in the off-hook state and after 400 milliseconds the shunt is again disabled by the timer removing it from the circuit. The timing circuit therefore ensures that the shunt is not across the loop during the time that talking is taking place.

When a call is placed to a subscriber's loop having the range extender circuit of the present invention, ringing will be applied. A ring detector circuit is provided in the range extender circuit which is connected to the base of the transistor and the gate of the PNPN switch so that upon the application of a ringing voltage to the subscriber's loop, the transistor and the PNPN switch will be placed into the cut-off condition. This ensures that no low impedance shunt path will be present to prematurely trip ringing before the called subscriber goes off-hook.

Accordingly, a feature of the present invention is a signal sensitive shunt range extension circuit having a timer to disable the shunt after an interval which is long enough to improve dial pulse transmission and ring trip supervision but which terminates before speech transmission is permitted.

Another feature of the present invention is a signal sensitive shunt range extension circuit having a circuit responsive to ringing current for disabling the shunt so that ringing will not prematurely be tripped.

DESCRIPTION OF THE DRAWING

The foregoing and other objects and features may be more apparent by referring now to the drawing in which.

GENERAL DESCRIPTION

Figure 1:
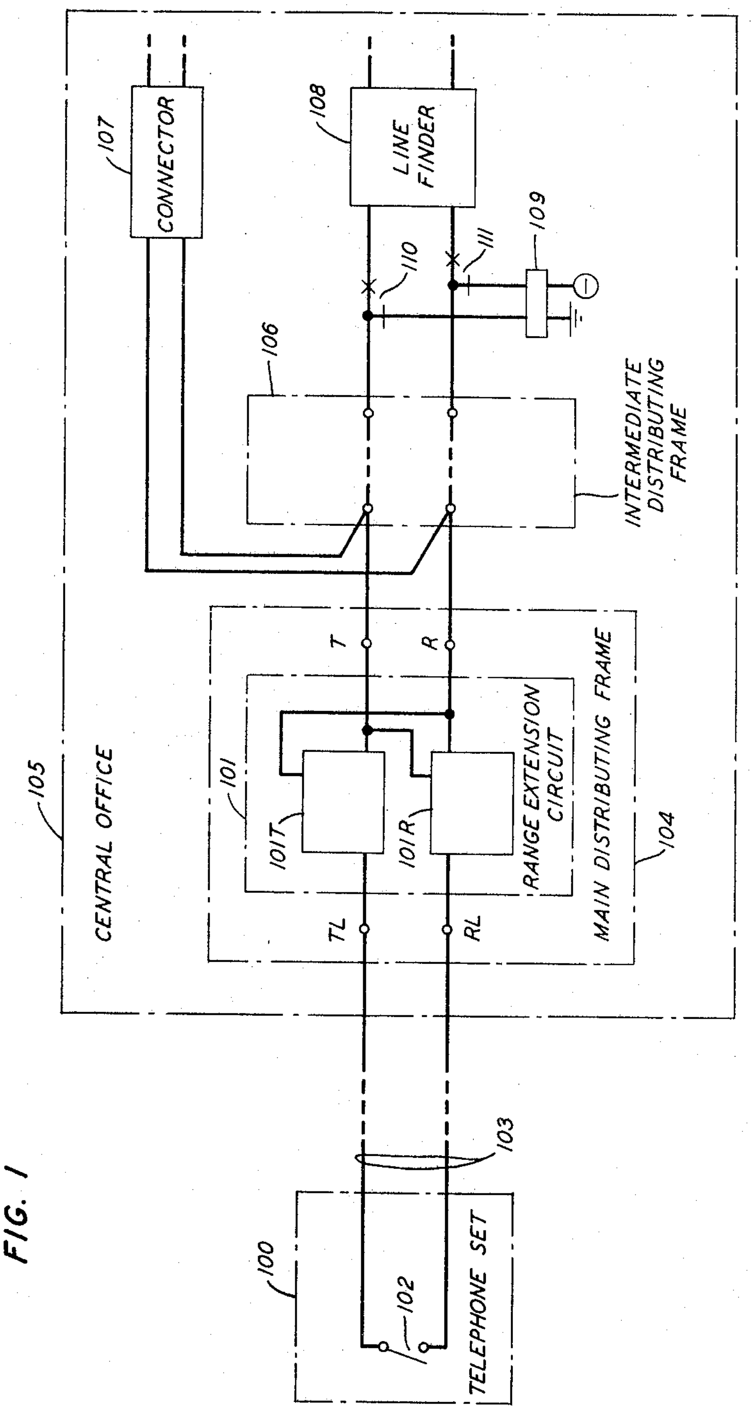
FIG. 1 shows the placement of the range extension circuit of the present invention with respect to the subscriber's telephone and a step-by-step central office.

In FIG. 1, the switchhook 102 of the subscriber's telephone set 100 is shown connected through the loop 103 to terminals TL and RL of the range extension circuit 101, which is mounted on the main distributing frame 104 of the central office 105. The loop continues from terminals T and R at the right-hand side of range extension circuit 101 to the intermediate distributing frame 106 where connection is made to connector 107, line finder 108, and line relay 109. The transfer contacts 110 and 111 are contacts of the line cut-off relay whose winding is not shown.

When the subscriber's telephone 100 is first placed in the off-hook condition, loop 103 is closed permitting the line relay 109 to operate over the path including the back contacts of cut-off relay transfer contacts 110, 111. A work contact (not shown) of the operated line relay 109 starts line finder 108 in the conventional manner. When the line finder 108 finds the calling line 103 it operates the cut-off relay (not shown) whose operated back contacts of transfer contacts 110, 111 remove line relay 109 from the circuit. The make contacts of transfer contacts 110, 111 connect the loop 103 to the line finder 108. Dial tone is then supplied to the loop 103 in the usual manner. On a terminating call to the loop 103, ringing is supplied to the loop 103 through the connector 107 and the calling party is connected to the loop 103 through the connector 107 after the called party answers.

Figure 2:
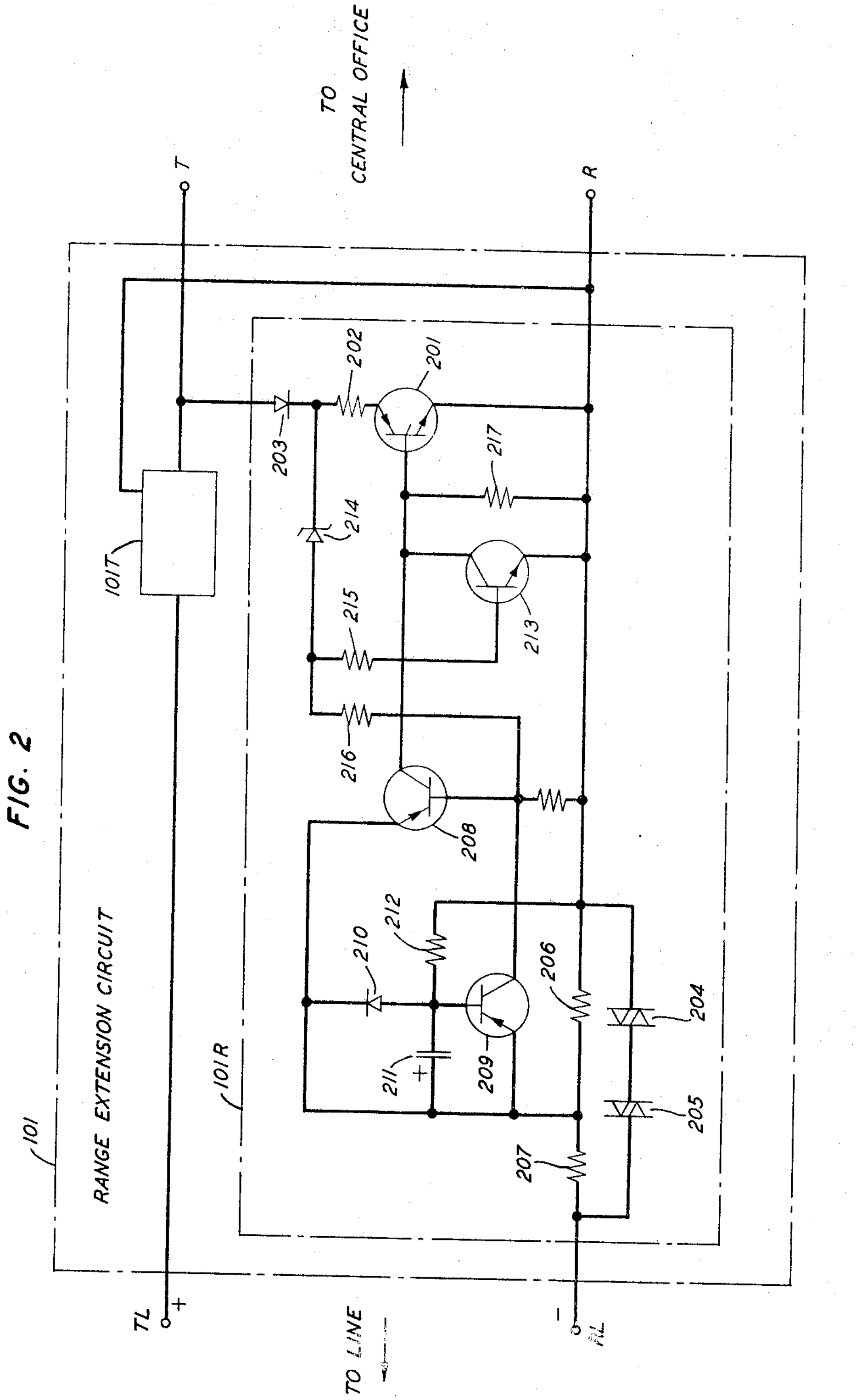
FIG. 2 is a detailed schematic diagram of one of the two identical halves of the illustrative range extension circuit.

In FIG. 2, only one of the two identical halves of the range extension circuit 101 is shown in detail. Since the polarity of the central office battery voltage on a subscriber loop can be reversed in a step-by-step system, identical circuits are provided for both the tip and the ring. The circuit 101R, shown in detail, senses current flow in the ring side of the loop from terminal RL to terminal R. Current in the opposite direction is sensed by the half of the range extender 101T, not shown in detail.

In FIG. 3, the successive enabling and disabling of the shunt at the calling end of the central office is shown in time relationships to the on-hook and off-hook intervals of a calling subscriber's loop. It is seen that the shunt "follows" the dial pulses and is disabled during the talking interval.

FIG. 4 shows the enabling of the shunt at the called end of the central office at the beginning of the silent interval of the ringing cycle after the called subscriber goes off-hook. This prevents premature tripping but aids in the operation of the ring trip relay when the called subscriber answers as will be hereinafter more fully explained.

DETAILED DESCRIPTION

Referring now to FIG. 2, circuit 101R which senses current in the ring conductor of the loop will now be described, it being understood that current in the tip conductor will be sensed by the corresponding circuit 101T. When the ring conductor is negative with respect to the tip conductor and PNPN switch 201 is turned on, PNPN switch 201, resistor 202, and diode 203 provide a shunt path and conduct current from the tip to the ring. When the ring conductor is positive with respect to the tip conductor, current flow in the opposite direction is blocked by diode 203 being back biased.

Varistors 204 and 205 are provided to limit the voltage drop in resistors 206 and 207, which are in series with the loop, and provide a low impedance path around these resistors for voice frequencies and the 20-cycle ringing voltage.

The operation of the range extension circuit will be explained in detail as the various parts of a call are examined.

OFF-HOOK

When the subscriber's telephone 100 is placed in the off-hook state, loop current flows through the tip and ring conductors. Loop current flows from right to left in the tip conductor and from left to right in the ring conductor. Current in the ring conductor produces a small voltage drop across resistor 206 (FIG. 2) which drop is sensed by transistor 208. This voltage drop causes transistor 208 to turn on. When transistor 208 is turned on, current flows from terminal RL through resistor 207, through the emitter-collector path of transistor 208, and into the gate of PNPN switch 201, thereby allowing PNPN switch 201 to turn on if this current is greater than a threshold value. The current through the shunt path comprising PNPN switch 201, resistor 202, and diode 203, adds to the subscriber loop current to insure operation of the line relay.

In accordance with an aspect of our invention, a timing circuit comprising transistor 209, diode 210, capacitor 211, and resistor 212 controls the maximum time that current can flow through the shunt path. Capacitor 211, which advantageously may be an electrolytic capacitor, is protected from reverse polarity voltage by diode 210. Timing starts when a voltage drop is produced across resistor 206. This voltage drop causes capacitor 211 to charge in series with resistor 212. When capacitor 211 has charged to a voltage which will forward bias the emitter-base junction of transistor 209, transistor 209 turns on. When transistor 209 turns on, the emitter-base junction of transistor 208 is effectively short-circuited, and transistor 208 therefore is turned off. The gate drive to PNPN switch 201 is thus removed. The value of resistor 217 is chosen so that the holding current of PNPN switch 201 is greater than the normal current through this device when the shunt is enabled. PNPN switch 201 therefore may be turned off by removing its gate drive. Thus, when transistor 208 turns off and removes the gate drive from PNPN switch 201, PNPN switch 201 is turned off, and current from tip to ring through the shunt path is interrupted. The maximum time interval that current can flow in the shunt path is arranged to be, for the illustrative embodiment, approximately 400 milliseconds.

DIALING

Since dialing does not commence until the off-hook condition has persisted for some moments, when dialing does commence, capacitor 211 is charged, transistor 209 is conducting, and PNPN switch 201 and transistor 208 are turned off. The train of dial pulses opens the loop a number of times for each dialed digit. Capacitor 211 discharges through resistors 206 and 212 during each interval that the dial opens the loop. When the dial recloses the loop, the lack of charge on capacitor 211 prevents transistor 209 from immediately turning on. Loop current flows and when the loop current increases to the threshold value, as determined by resistor 206 and transistor 208, transistor 208 turns on, thereby allowing PNPN switch 201 to turn on and place the shunt across the loop; the turn-on threshold level of PNPN switch 201 may be slightly greater than that of the transistor-resistor combination. When the loop is opened on the next dial pulse transistor 208 turns off turning off PNPN switch 201. Succeeding openings and closings of the loop are detected by transistor 208 and PNPN switch 201 as the dial generates pulses. The dial pulse intervals are short compared with the timing interval and therefore transistor 209 will not turn on to disable PNPN switch 201 during the dialing of a digit. At the end of the pulse train, capacitor 211 again charges within 400 milliseconds to a voltage where transistor 209 will turn on and cause the shunt to be removed from the loop.

Figure 3A:
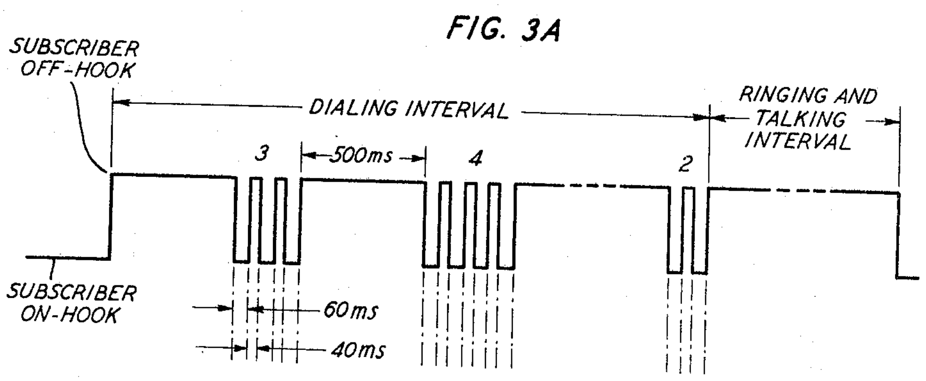
FIGS. 3A and 3B show the timing relationship between the on-hook and off-hook conditions of the calling subscriber's loop and the enabling and disabling of the range extension circuit.
Figure 3B:
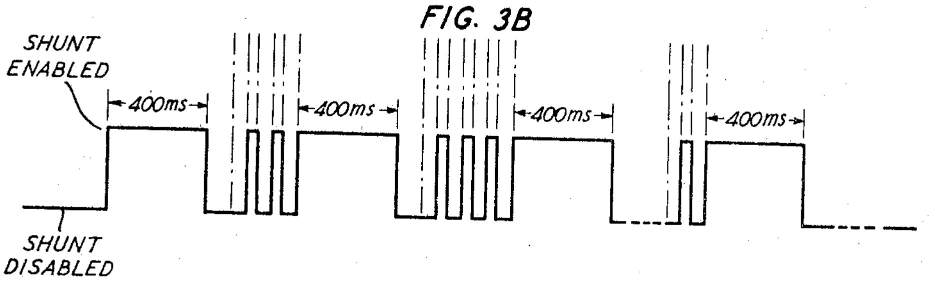

FIGS. 3A and 3B graphically depict the range extension circuit "following" the dial pulses. When the calling subscriber first goes off-hook, the range extension circuit is enabled immediately. Since this first off-hook interval is longer than 400 milliseconds, the shunt is disabled before dialing begins. Dialing starts with an on-hook condition. This on-hook interval, 60 milliseconds in the illustrative embodiment, is long enough to allow capacitor 211 to discharge to a point where the first off-hook condition of the digit dial pulse train can re-enable the shunt. This off-hook interval, 40 milliseconds, is much less than the 400 millisecond timing interval, so the shunt remains enabled until the next on-hook. The shunt therefore "follows" the dial pulses within the digit. The interdigital interval, assumed to be 500 milliseconds, is longer than the 400 millisecond timing interval so that the shunt is disabled before the start of each digit pulse train; satisfactory circuit operation will however take place even if the interdigital interval is less than the timing interval. After all the digits are dialed, the calling subscriber's loop is in the off-hook state and it remains in this state until the subscriber hangs up. The shunt therefore is disabled about 400 milliseconds after the conclusion of dialing and is not enabled again until the subscriber first goes on-hook and then off-hook.

RINGING

When ringing is applied to the called subscriber's loop, the range extender is disabled to prevent premature tripping of ringing. During part of each cycle of the 20-cycle ringing signal, a ringing disable circuit comprising transistor 213, Zener diode 214, and resistors 215 and 216, prevents PNPN switch 201 from being turned on. Diode 214 conducts when the ringing voltage between ring and tip conductors at the input to the range extender is greater than its breakdown voltage. As the ring goes negative with respect to the tip and the breakdown voltage of diode 214 is exceeded, diode 214 conducts in the backward direction and current flows in resistor 216 to drive the base of transistor 208 positive with respect to its emitter, thereby turning it off. Transistor 208 turning off interrupts the gate drive of PNPN swich 201 and this causes PNPN switch 201 to be turned off. Current through diode 214 also flows through resistor 215 and turns on transistor 213 to further ensure that PNPN switch 201 is turned off.

RING TRIP

Figure 4A:
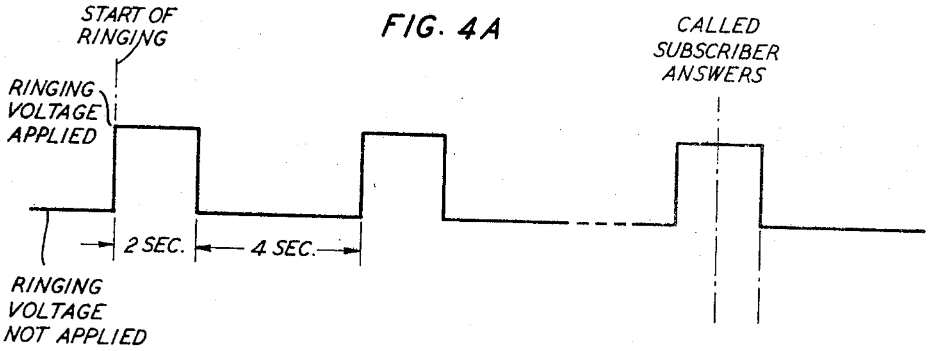
FIGS. 4A and 4B show the timing relation between application of ringing voltage and the enabling and disabling of the shunt for a called subscriber's loop.
Figure 4B:
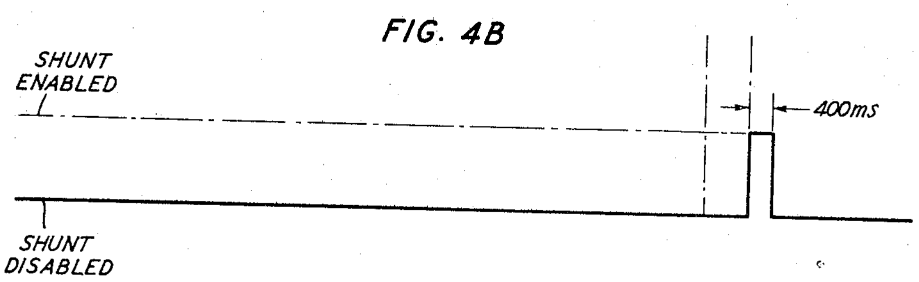

When a call is answered by the called subscriber going off-hook, the range extender connected to the called subscriber's loop inserts the shunts path across the loop for the 400 millisecond timed interval in order to increase the current to, and aid the operation of, the ring trip relay. Since the range extender is disabled during the interval when ringing voltage is connected to the loop, the additional current is supplied only during the silent interval. FIGS. 4A and 4B illustrate this.

ON-HOOK

When the loop returns to the on-hook condition, capacitor 211 discharges through resistors 206 and 212. The circuit is then ready to respond to the next off-hook or ringing condition.

It is understood that the above-described arrangement is merely illustrative of the application of the principles of the invention. Numerous other arrangements may be devised by those skilled in the art without departing from the spirit and scope of the invention.

What is claimed is:

1. In a telephone system employing a range extender circuit which inserts a current shunt across the subscriber's loop at the central office to increase current through a central office relay when the loop is closed at the subscriber's telephone, the improvement comprising timing means for timing an interval commencing with each closure of said loop by said telephone and means controlled by said timing means for removing said shunt from said loop after said closure has persisted for an interval of time sufficient to insure the operation of said central office relay in response to said closure.

2. In a telephone system according to claim 1, the improvement wherein said timing means includes a capacitor which begins to accumulate electrical charge when said loop is closed and which begins to lose said electrical charge when said loop is opened.

3. In a telephone system according to claim 2, the improvement wherein said means controlled by said timing means comprises a transistor which is turned on when said charge on said capacitor is greater than a predetermined value.

4. In a telephone system according to claim 1, the improvement further comprising means for detecting the application of a ringing signal to said loop and means operative responsive to said detecting means for inhibiting the insertion of said shunt across said loop during the interval that said ringing signal is applied to said loop.

5. In a telephone system employing a range extender circuit which inserts a current shunt across the called subscriber's loop at the central office to increase current through a central office relay when the loop is closed at the called subscriber's telephone, the improvement comprising means for detecting current flow in the conductors of said subscriber's loop in response to the closure thereof, means for detecting the application of a ringing signal to said loop, and means controlled by said ringing signal detecting means during the active interval of said ringing signal for inhibiting said current flow detecting means, said current flow detecting means being permitted to detect said current flow in said conductors during the silent interval of said ringing signal.

6. In a telephone system, a selectively controllable range extender circuit comprising first transistor means including a first transistor for sensing current flow in the conductors of a subscriber's loop, switch means controlled by said first transistor means for shunting said subscriber's loop, second transistor means for disabling said first transistor a predetermined time interval after the start of said current flow in said loop, and means for detecting the application of ringing potential to said loop for disabling said first transistor.

7. In a telephone system according to claim 6, the circuit wherein said first transistor means includes a voltage dropping resistor connected in series with one conductor of said loop, said first transistor having its base-emitter path and a base-biasing resistor connected to sense the voltage drop across said voltage dropping resistor, and wherein said ringing potential detecting means includes a Zener diode connected from the other conductor of said loop to the junction of said base and said base-biasing resistor.

8. In a telephone system according to claim 7, the circuit wherein said second transistor means includes a second transistor having its collector-emitter path connected to short-circuit said base-emitter path of said first transistor.

9. In a telephone system according to claim 7, the circuit wherein said ringing potential detecting means further includes a third transistor whose base is connected to said Zener diode and whose collector-emitter path is connected to inhibit the operation of said switch means when the application of ringing potential is detected.

10. In a telephone system according to claim 9, the circuit wherein said switch means comprises a PNPN transistor whose anode-cathode path is connected across said loop and whose gate is connected to the collectors of said first and third transistors.

11. A range extension circuit for a telephone subscriber's loop comprising current shunt means, means for detecting current flow in at least one of the conductors of the subscriber's loop for enabling said shunt means, timing means for timing an interval commencing with each detection of current flow in the one conductor, and means controlled by said timing means for disabling said current shunt means after said interval.

12. A range extension circuit according to claim 11 further comprising means for detecting the application of a ringing signal to the subscriber's loop and means controlled by said ringing signal detecting means for inhibiting said current flow detecting means during the active interval of said ringing signal.

No references cited.

K. CLAFFY, Primary Examiner

J. S. BLACK, Assistant Examiner